Apr. 24, 1923.  1,453,103

A. E. GOTT
GYROSCOPIC COMPASS
Filed Feb. 12, 1921  3 Sheets-Sheet 1

INVENTOR
ARTHUR E. GOTT.
by Edward Williams
his Attorney.

Apr. 24, 1923.

A. E. GOTT

GYROSCOPIC COMPASS

Filed Feb. 12, 1921

INVENTOR:
ARTHUR E. GOTT.
By Edward Williams
his Attorney.

Patented Apr. 24, 1923.

1,453,103

UNITED STATES PATENT OFFICE.

ARTHUR EDGAR GOTT, OF SOUTHALL, ENGLAND.

GYROSCOPIC COMPASS.

Application filed February 12, 1921. Serial No. 444,313.

*To all whom it may concern:*

Be it known that I, ARTHUR EDGAR GOTT, a subject of the King of Great Britain and Ireland, residing at Southall, in the county of Middlesex, England, have invented new and useful Improvements in Gyroscopic Compasses, of which the following is a specification.

This invention relates to gyroscopic compasses and particularly to means for correcting intercardinal errors in gyroscopic compasses of the type in which the directive element is not stabilized in all directions. Intercardinal errors are those errors which are found to arise when the ship on which such an instrument is mounted is rolling and pitching on an intercardinal course. These errors are caused by torque generated about the vertical axis from several sources arising from the swinging effects of rolling and pitching and are due to gyroscopical reactions, irregular arrangement of mass about the vertical axis of the swinging parts, and interactions between the parts which swing with true centrifugal motion and those such as the gyro case and wheel which are stabilized in one plane.

The separate errors so generated may have either positive or negative values depending on the design and construction of the instrument, the total deviation being the algebraic sum of the separate effects. A part is said to have true centrifugal motion when it rotates about the axis of oscillations during swinging, whereas parts which are stabilized in one plane have a movement of translation only when oscillating in the plane containing the axle, this plane being normally the N-S plane.

Various methods of minimizing and correcting these deviations have been devised and in one of these methods the whole of the foregoing causes so far as they arise from true centrifugal action have been corrected by the application of mass to the parts of the instrument having true centrifugal motion so as to give generally a uniform moment of inertia in all vertical planes containing the centre of gravity but including positive or negative correction in a N-S plane to compensate for the interaction between the centrifugal and the stabilized parts.

Such stabilized parts of the type of compass referred to, except the rotor partake of centrifugal motion in an E-W plane or in a plane having an E-W component. The rotor, by reason of its frictionless supports and its uniformity of moments of inertia in all planes containing its axle, partakes of no centrifugal motion whatever.

Generally speaking, an error arising either from mass displacement of the centrifugally swinging parts or from interaction between these parts and the stabilized parts, cannot be corrected except by mass correction on the true centrifugal swinging parts, for instance, on the vertical ring supporting the gyro case and, as a corollary, it is equally true that if such corrections were applied to the gyro case they would become ineffective in N-S planes and deviation would result therefrom.

The present invention purposes to correct a cause of deviation not previously recognized arising from E-W components of swinging of the gyro case and stabilized parts by the application of mass direct to the gyro case.

Equality of moments of inertia in vertical planes containing the vertical axis is not essential in the stabilized parts of a gyroscopic compass i. e. the gyro case but it is important that the planes mutually at right angles passing through the centre of gravity and containing the maximum and minimum moments of inertia should be vertical and coincident with the cardinal planes, i. e. the vertical plane containing the axle of the instrument and the plane at right angles thereto and it is preferable that the plane containing the maximum moment should coincide with the plane of rotation. Owing to the shape and general configuration of the parts forming the wheel and case of a compass as generally constructed, this plane of maximum moment will generally approximate towards the plane of rotation but not necessarily coincide therewith owing to the irregular arrangement of parts attached to the case with the result that the plane containing the maximum moment of inertia may not actually coincide either with the plane of rotation or with the vertical axis and consequently swinging in an E-W plane tends to create a torque about the vertical axis by reason of the plane in which the moment of inertia is maximum tending to set itself into the plane of oscillation although the gyro case may be perfectly balanced statically about each of its three principal axes.

A similar argument applies equally to the horizontal axis of the gyro case in which case a plane of maximum moment of inertia containing the horizontal axis but displaced from the vertical plane therethrough will tend to tilt the gyro axle from the horizontal, thereby causing deviation by gyroscopical reaction. It may also be noted that the displacement of the plane of maximum moment of inertia from both vertical and horizontal axes tend to deviation in the same direction.

It is therefore important that the plane through the centre of gravity of the gyro case and its rotor and containing the maximum moment of inertia should be vertical and coincide with one of the cardinal planes preferably the plane of rotation and according to the present invention, the mass upon the gyro case is so distributed as to establish this coincidence and thereby prevent deviation arising from this condition.

The correction means cannot be applied to the centrifugal moving parts as they would then be operative in a N-S direction, in which direction the cause becomes inoperative. Deviation would therefore result therefrom in any plane particularly midway between the planes on which the adjustment has been made. For instance if a mass correction for intercardinal effects which included a displaced plane of maximum moment of inertia in the gyro case was applied to the vertical ring and correction made in N-E and N-W planes an error by cover and under correction would occur in N-S and E-W planes respectively and cause a maximum deviation in the same direction in these planes. It is for this reason that it is necessary to effect the mass correction for the gyro case and stabilized parts attached thereto upon the case itself in a manner which will preserve the static balance under all circumstances.

Masses may be added to the gyro case for the combined purpose of correcting the static balance and effecting the dynamical requirement simultaneously but in the event of the direction of the required dynamical correction being unknown it is preferable to effect the two balance independently.

In order to elucidate the foregoing argument and to render clear the present invention and enable it to be readily carried into effect, some examples of means employed for effecting and maintaining the required correction will now be more fully described with reference to the accompanying drawings in which:—

Figure 1:
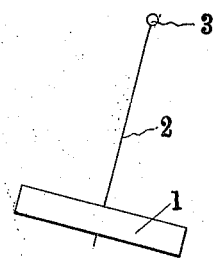
Figs. 1 and 2 illustrate the movement of true centrifugal and stabilized swinging.
Figure 2:
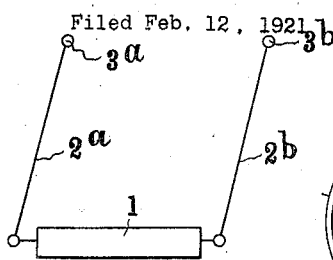

Referring to the drawings, Figs. 1 and 2 are intended to illustrate the distinction between true centrifugal and stabilized motion in which a mass 1, in Fig. 1 is supported on a rod 2 or in an equivalent manner so that it is free to rotate about the axis of the rod only but partakes of all rotary motion, about the point or axis 3 on which the rod swings.

Owing to the torque generated about the radius of suspension by centrifugal action, the mass A–B tends to set its greatest length into the plane of oscillation. If, however, it is supported by two pivoted rods $2^a$, $2^b$ in the manner shown in Fig. 2, or the equivalent so that its mass length characteristics remain parallel at all parts of the oscillation there is no tendency for the mass to turn into the plane of oscillation.

Figure 3:
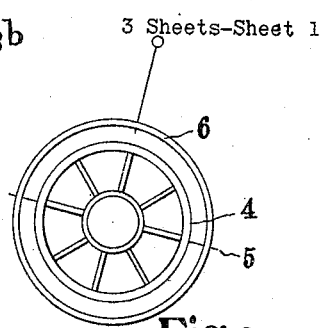
Figs. 3 and 4 are diagrammatic south and west elevations showing the usual method of supporting the rotor case of a gyroscopic compass.
Figure 4:
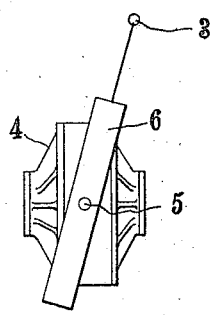

As shown in Figs. 3 and 4, the rotor case 4 of a gyro-compass is usually suspended about a horizontal axis 5 in a vertical ring 6 and both the case 4 and ring 6 swing with true centrifugal motion in an east-west plane as in Fig. 3. In the north-south plane, however, the case 4 is stabilized against centrifugal action whilst the vertical ring 6 and the associated parts swing with true centrifugal motion as in Fig. 4. Accordingly corrections for moments of inertia must be applied independently to each part so as to give accurate compensation in all directions of vertical planes.

It should further be explained that a symmetrical gyro case stripped of its orienting and damping mechanism, and accessories, and perfectly balanced about its various axes conforms practically to the dynamical condition required. If, however, by the addition of parts, transformer, vacuum gauge, auxiliary gyros, liquid mass vessels and other orienting and damping mechanism in an irregular manner, although balanced about the various axes of the gyro case, the plane of maximum moment of inertia cannot coincide with the plane of rotation and deviation results when swinging in any other direction than the quadrantal one in which composite corrections may have been effected.

Figure 5:
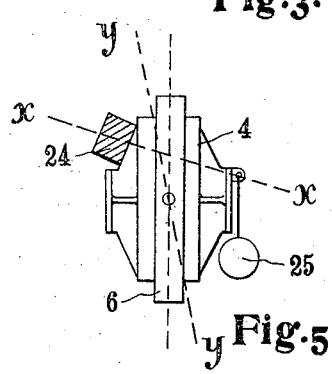
Figs. 5 and 6 are west elevation and plan showing displaced details or accessories thereon and illustrating the resultant mass-radius distribution.
Figure 6:
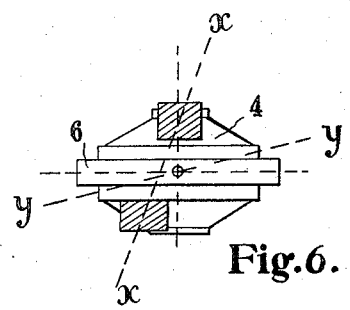

As shown in Figs. 5 and 6, which show a conventional form of compass gyroscope in west elevation and plan, the maximum moment of inertia of the case 4 alone may actually occur in the vertical plane containing the axis of rotation but the addition of masses for orienting and damping purposes, have their own planes of maximum moment of inertia $x$—$x$ and although balanced the resultant plane of maximum moment of inertia $y$—$y$ does not coincide either in elevation or plan.

The direction of the resultant plane of maximum moment of inertia tends during swinging to pass into the plane of oscillation with a resulting deviation of the compass.

One method of carrying the invention into practice consists in fitting to the case, masses preferably elongated in form and adjustable about the horizontal axis of the case or an axis parallel thereto or the vertical axis or both axes so that the major axes of the masses may be placed in any plane containing the selected axis about which the correction is being made and secured permanently thereto after the corrected position has been found by oscillation of only the parts referred to or such combinations as may be desired.

As an example, in Figs. 5 and 6 the line $y$—$y$ indicates the direction in elevation and plan of the displaced maximum.

Figure 7:
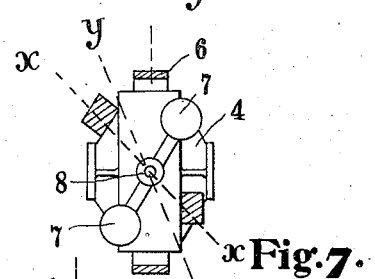
Figs. 7, 8 are similar views showing corrected masses applied to the horizontal and vertical axes respectively

Fig. 7 shows a balanced mass 7 attached to the end of the horizontal axle 8 and having rotational adjustment in a vertical plane and means for securing it in the adjusted portion. It is first secured approximately in a direction giving an effect opposing the displacement $y$—$y$ and finally adjusted by a designed swinging test hereinafter referred to.

Figure 8:
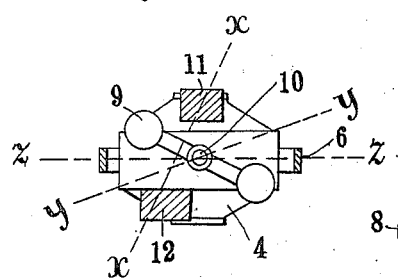

Fig. 8 shows a plan view of a similar mass 9 adjustable about the vertical axis 10 in which owing to irregular distribution of masses 11, 12, and a resultant plane of maximum moment of inertia through $y$—$y$, the compensator 9 opposes the undesirable centrifugal action and creates a new resultant maximum in the plane of rotation $z$—$z$.

Figure 9:
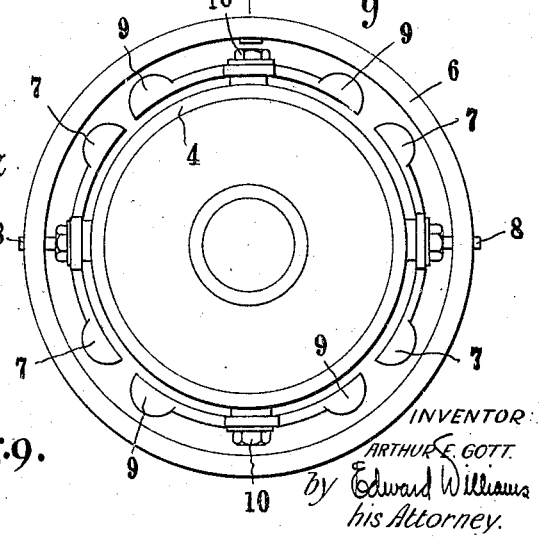
Fig. 9 is a south elevation showing correcting masses applied to both these axes.

Fig. 9 shows a side view of the gyro case 4 having compensators 7, 9 on both the horizontal axis 8 and the vertical axis 10. These elongated and axially moved correctors 7, 9 may be shaped to fit the configuration of the case and may either be solid or may be built up of parts of equal mass or mass moments applied equally to their opposite ends for the purpose of adaption of their total moment of inertia to an amount comparable with that required for the correction. The said correctors 7, 9 may be applied to both ends of an axis either independently or together or the whole correction means may be in the form of a closed rectangle or ring on which the masses may be adjustable in a second plane or about a second axis, thus effecting dynamical correction about two axes with one set of compensators.

Figure 10:
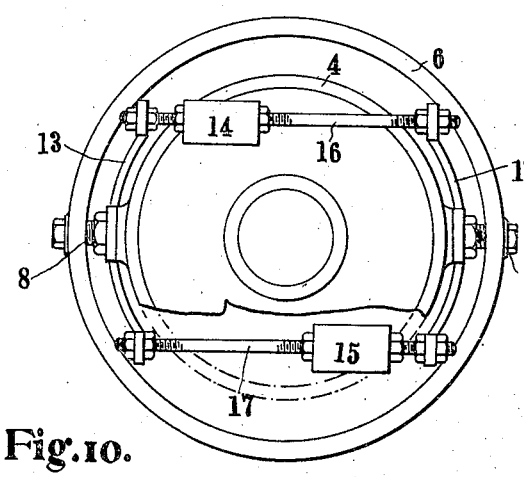
Figs. 10 and 11 are south and west elevations showing a frame system rotatable about one axis with masses adjustable in the plane of the frame.
Figure 11:
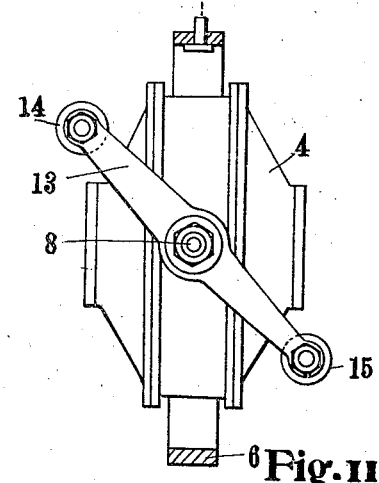

Figs. 10 and 11 show a movable frame 13 attached to the horizontal axle 8, on the two sides of which masses 14, 15 may be carried adjustably on the length of the bars 16, 17 the whole frame 13 also being adjustable about the horizontal axis 8.

A similar form of frame may be attached to the vertical axis, and in either case, provision may be made for varying the radius from the axis at which the correcting masses 14, 15 may be placed.

Figure 12:
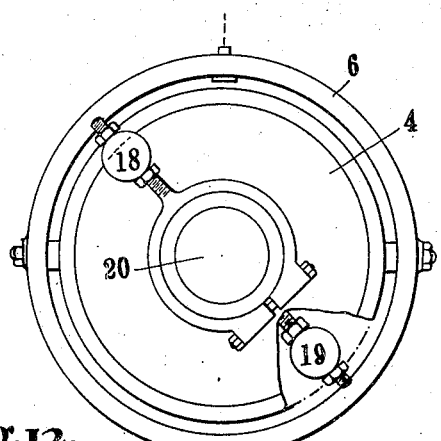
Figs. 12 and 13 are similar views showing two masses independently adjustable about the gyro axle.
Figure 13:
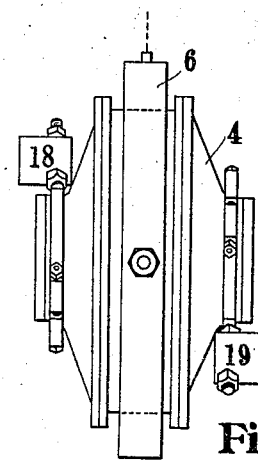

Movable and adjustable masses 18, 19 may also be arranged about the gyro axle 20 as in Figs. 12 and 13 provided they are statically balanced and diametrically opposed to each other on opposite sides of the case 4 through either the centre of gravity or a point below it in the same vertical line if it is desired to combine the correcting masses with the pendulous orienting factor of the case. This method of placing the balanced masses below the mechanical centre so as to assist the orienting factor may be applied with all the combinations.

Figure 14:
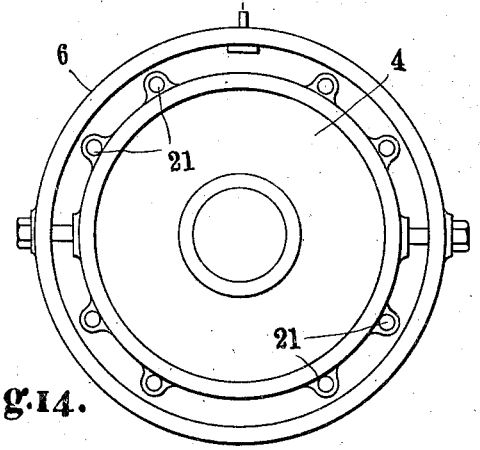
Figs. 14 and 15 are similar views showing adjustable masses arranged parallel to the gyro axle.
Figure 15:
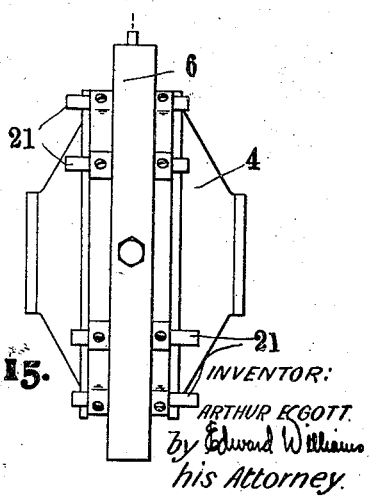
Figure 16:
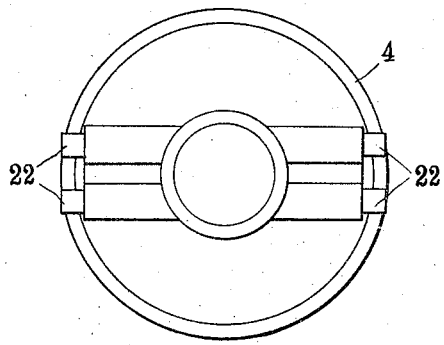
Figs. 16 and 17 are similar views showing masses adjustable about and parallel to the horizontal axis of the gyro case.
Figure 17:
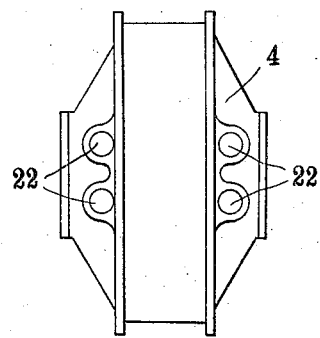

Alternatively, dynamical correction may be applied to the gyro case 4, by separate masses applied to the cylindrical surface on opposite sides of the centre of gravity by the provision of suitable seatings or receptacles for their movement and permanent fixing in opposite directions on opposite sides of the centre of gravity. For instance, the circumference of the case 4 may be provided with cylindrical holes parallel to the gyro axle as in Figs. 14 and 15 into which cylindrical masses 21 may be fixed adjustably and clamped in any desired manner with opposite eccentricities on opposite sides of the gyro axle. Similar means may be provided parallel to the horizontal or vertical axes as shown at 22 in Figs. 16 and 17.

Figure 18:
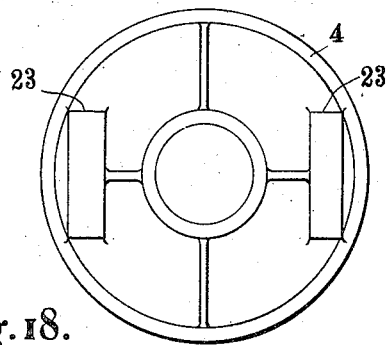
Figs. 18 and 19 show a similar arrangement with the masses parallel to the vertical axis: and, Figs. 20 and 21 show sockets or plugs forming part of the case which may be machined, drilled or filled with lead.
Figure 20:
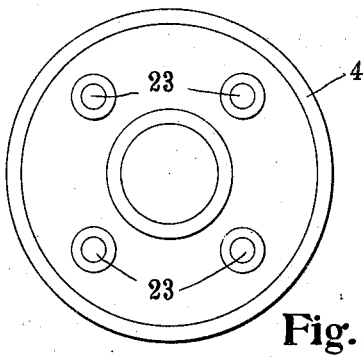
Figure 19:
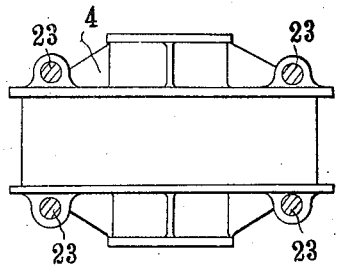
Figure 21:
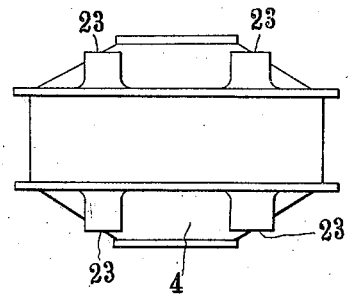

As a further alternative, the gyro case 4 may be provided with seatings or provision for attachment of similar masses on opposite sides of the centre of gravity and having a diagonal arrangement relative to the principal axes as at 23 in Figs. 18 and 19 the masses being further provided with screw attachment and adjustment means if desired so that they may be adjusted for either dynamical or static balance or both.

Similarly vessels may be provided for the reception of lead or other form of mass so that correction may be made by pouring in liquid and sealing in place. Combinations of the foregoing may be provided to facilitate the final adjustment.

In order to carry out the test by which the error is determined and the correction effected, the gyro case 4 may be provided with means for suspending it with all its accessories as seen at 24 and 25 (Fig. 5) in place but without the vertical ring 6. It should be free to turn about the vertical axis and the test may be made with the rotor at rest.

After removal of torque, if any, from the suspending means and adjustment of the rotational plane of the case into a convenient plane for oscillation, swinging in this plane will demonstrate the direction and amount of correction required but will only enable one to adjust the plane containing the maximum moment of inertia into coincidence with the horizontal axis of the case but not into coincidence with the vertical axis.

Treatment for the latter necessitates the use of the vertical ring 6.

If therefore, the case 4 is fitted into the vertical ring 6, it will be free to move about two axes and deviations from either axis may be compensated accurately. It must, however, be remembered that there are reactions between the horizontal and vertical planes and consideration must be given as to which axle requires adjustment of the corrector.

An alternative method of testing for adjustment about both axes is to fit the gyro case 4 with all its appurtenances into the vertical ring 6 which should be stripped of its intercardinal and acceleration compensators and which should then have by reason of its symmetrical construction, its maximum moment of inertia in its central plane passing through its pivots and therefore parallel to the plane of rotation and ineffectual to cause deviation in an E-W plane.

Oscillation of the running compass in this condition in an E-W plane will indicate deviation if the plane of maximum moment of inertia is not coincident with the plane of rotation. In order to decide upon which is the axis about which the adjustment is required, the gyro case 4 may be locked about its horizontal axis in the vertical ring 6 but left free to rotate in azimuth to effect the correction about the vertical axis. Assuming that the compensators 7 and 9 are attached to the horizontal and vertical axes as in Fig. 9 they should statically balance when they are in any direction but for the purpose of test should first be housed in a cardinal plane preferably the plane of rotation.

The suspended combination should then be set with the ring and case parallel to a plane in which it can be oscillated. If the gyro wheel is at rest this may be in any direction. Any torque arising from the means of suspension is removed, after which swinging in this plane will indicate the correction required. Deviation of the plane of maximum moment of inertia from the plane of rotation in plan will now cause the case to turn about the vertical axis the direction and amount being noted. The compensators 9 about the vertical axis are then adjusted by trial until their opposing effect neutralizes the unbalanced torque and until oscillation or swinging causes no movement about the vertical axis.

If the gyro wheel is running during this test, the settling direction of the axle or compass must first be determined with the compass standing and afterwards oscillated and corrections made until any deviation is cancelled. The compensators 9 about the vertical axis are then locked and the horizontal axis of the gyro case 4 is released. Similarly the vertical ring 6 may be locked to the plane of oscillation with the gyro case 4 free about its horizontal axis for effecting the correction about that axis. In this instance, it is assumed from the previous test that the plane of maximum moment of inertia now coincides with the horizontal axis of the gyro case 4 but may be tilted relative to the vertical axis.

Swinging again in the same plane with the compensators 7 about the horizontal axis housed as before will cause the plane of maximum moment of inertia to turn about the horizontal axis and the direction of the tilt may be observed from the levels. The horizontal axis compensators 7 are now turned in the direction of the tilt and adjustments are made until the tendency to tilt is eliminated.

In the event of not locking the vertical axis in this test the tilt reaction will cause a deviation from which a similar deduction may be made. If these tests are prolonged and necessitate the removal of the orientation means from the compass, allowance must be made for the position in latitude and the earth's rotation.

The adjustments to the mass correctors 7, 9, having been made in this manner their accuracy may be proved by completely freeing the gyro case 4 and allowing the orientation means to operate for complete and correct functioning. The instrument should then show no deviation when continuously oscillated in an E-W plane. For gyro compasses of any particular type the character of the final compensation will be practically uniform and with the arrangement shown in Fig. 9, the adjacent ends of the vertical and horizontal adjusters 9 and 7 may be considered as a single mass having its centre of gravity in the resultant position and mass of both units. This consideration then may suggest a more compact form of compensation or one of the other forms as described in the other figures of the drawings.

What I claim as new and desire to secure by Letters Patent of the United States is:—

1. In a gyroscopic compass, the combination of a suspended vertical ring, a gyro case pivotally mounted therein, a gyro rotor revolubly mounted in said case and masses distributed upon the said gyro case adjustable about vertical and horizontal axes so that the maximum moment of inertia of the said case and rotor about an axis passing through the centre of gravity occurs in a vertical plane passing through the centre of gravity of the said case and rotor and containing one of the cardinal axes.

2. In a gyroscopic compass, the combination of a suspended vertical ring, a gyro case revolubly mounted therein, a gyro rotor mounted in bearings in said case and adjustable masses distributed upon the said gyro case so that the maximum moment of inertia of the said case and rotor about an axis passing through the centre of gravity occurs in a vertical plane passing through the centre of gravity of the said case and rotor and coinciding with the plane of rotation of said gyro.

3. In a gyroscopic compass, the combination of a suspended vertical ring, a gyro case pivotally mounted therein, a gyro rotor revolubly mounted in said case and adjustable masses applied to said case to balance the latter dynamically about an axis parallel to but below the mechanical axis of the instrument so that said masses impart a pendulous factor to said case.

4. In a gyroscopic compass, the combination of a suspended vertical ring, a gyro case pivotally mounted therein, a gyro rotor revolubly mounted in said case and masses adjustably distributed both radially and circumferentially upon the said gyro case so that the maximum moment of inertia of the said case and rotor about an axis passing through the centre of gravity accurs in a vertical plane passing through the centre of gravity of the said case and rotor and containing one of the cardinal axes.

5. In a gyroscopic compass, the combination of a suspended vertical ring, a gyro case pivotally mounted therein, a gyro rotor revolubly mounted in said case and masses carried by said case and adjustable with respect thereto to establish the plane of maximum moment of inertia into coincidence with the vertical axis and one of the horizontal axes of said case.

6. In a gyroscopic compass, the combination of a suspended vertical ring, a gyro case pivotally mounted therein, a gyro rotor revolubly mounted in said case and adjustable masses carried by said case to bring the plane of maximum moment of inertia into coincidence with the vertical axis and with the plane of rotation of said gyro rotor.

7. In a gyroscopic compass, the combination of a suspended vertical ring, a gyro case pivotally mounted therein, a gyro rotor revolubly mounted in said case and masses adjustable about vertical and horizontal axes to bring the plane of maximum moment of inertia into coincidence with the vertical axis of said case and with the east-west plane.

8. In a gyroscopic compass, the combination of a suspended vertical ring, a gyro case pivotally mounted therein, a gyro rotor revolubly mounted in said case and adjustable masses for bringing the dynamical axes mutually at right angles into coincidence with the cardinal and vertical planes containing the vertical axis of the instrument.

9. In a gyroscopic compass, the combination of a vertical ring, a gyro case pivotally mounted therein, a gyro rotor revolubly mounted in said case and means for compensating for inertia comprising adjustable masses carried by said case and balanced about the axes of the gyro case.

10. In a gyroscopic compass, the combination of a vertical ring, a gyro case pivotally mounted therein, a gyro rotor revolubly mounted in said case and means for compensating for inertia comprising masses adjustably mounted in a plurality of positions and balanced about the axes of the gyro case.

11. In a gyroscopic compass, the combination of a vertical ring, a gyro case pivotally mounted therein, a gyro rotor revolubly mounted in said case and means carried by said case having its mass adjustable relative to the case about two axes mutually at right angles.

12. In a gyroscopic compass, the combination of a vertical ring, a gyro case pivotally mounted therein, a gyro rotor revolubly mounted in said case and means for compensating for inertia comprising masses carried by said case adjustable about an axis parallel to but below the mechanical axis of the rotor.

13. In a gyroscopic compass, the combination of a suspended vertical ring, a gyro case pivotally mounted therein, a gyro rotor revolubly mounted in said case, guiding means on the circumference of said case and compensating masses adjustably connected to said guiding means.

14. In a gyroscopic compass, the combination of a suspended vertical ring, a gyro case pivotally mounted therein, a gyro rotor revolubly mounted in said case, guiding means and compensating masses adjustably connected to said guiding means on opposite sides of said case.

15. In a gyroscopic compass, the combination of a suspended vertical ring, a gyro case pivotally mounted therein, a gyro rotor revolubly mounted in said case, guiding means and compensating masses adjustably connected to said guiding means on opposite diameters of said case.

16. In a gyroscopic compass, the combination of a compass mounting, a vertical ring suspended therefrom, a gyro case pivotally mounted in said ring, a gyro rotor revolubly mounted in said case and partaking of an east-west component of swinging on all off-meridian courses when the compass mounting is caused to roll and means for bringing the maximum mass radius distribution of the said case and rotor into coincidence with the horizontal gyro axes.

17. In a gyroscopic compass, the combination of a vertical ring, a pivotally mounted gyro case with supplementary instruments disposed thereon, a gyro rotor revolubly mounted in said case, and means for compensating for inertia comprising adjustable masses carried by said case balanced about the axes of the gyro case.

18. In a gyroscopic compass, the combination of a suspended vertical ring, a gyro case pivotally mounted therein and having supplemental appliances positioned thereon, a gyro rotor revolubly mounted in said case, guiding means on the case, and compensating masses connected to said guiding means.

ARTHUR EDGAR GOTT.